United States Patent

Meier et al.

[11] Patent Number: 5,192,021
[45] Date of Patent: Mar. 9, 1993

[54] ARRANGEMENT FOR HEATING PASSENGER AREAS OF VEHICLES

[75] Inventors: Richard Meier, Stein; Herbert Knorr, Rednitzhembach, both of Fed. Rep. of Germany

[73] Assignee: MAN Nutzfahrzeuge Aktiengesellschaft, Munich, Fed. Rep. of Germany

[21] Appl. No.: 748,639

[22] Filed: Aug. 22, 1991

[30] Foreign Application Priority Data

Aug. 23, 1990 [DE] Fed. Rep. of Germany ....... 4026595

[51] Int. Cl.$^5$ .............................................. B60H 1/18
[52] U.S. Cl. .................. 237/2 A; 237/12.3 B; 237/12.3 C; 165/39
[58] Field of Search ............. 237/2 A, 12.3 B, 12.3 C; 165/39

[56] References Cited

U.S. PATENT DOCUMENTS 5,123,594  6/1992  Humburg ........................... 237/2 A

FOREIGN PATENT DOCUMENTS 3509016  9/1985  Fed. Rep. of Germany .

Primary Examiner—Arnold Rosenthal
Attorney, Agent, or Firm—Robert W. Becker & Associates

[57] ABSTRACT

An arrangement for heating the passenger area of a vehicle. To increase the heating efficiency without requiring the use of more fuel, disposed upstream of the exhaust gas heat exchanger is a catalytic converter that particularly during idling and in a partial load range provides additional thermal energy via secondary combustion of unburned hydrocarbons. To regulate the heat flow that is transferred to the warm water circuit, an exhaust gas diverter is provided that can be controlled by thermal-lug switches in such a way that when heat is required, it can divert the exhaust gas through the exhaust gas heat exchanger or, when too much heat is being supplied from the cooling water and the exhaust gas, the exhaust gas is conveyed directly to the atmosphere via the muffler.

2 Claims, 1 Drawing Sheet

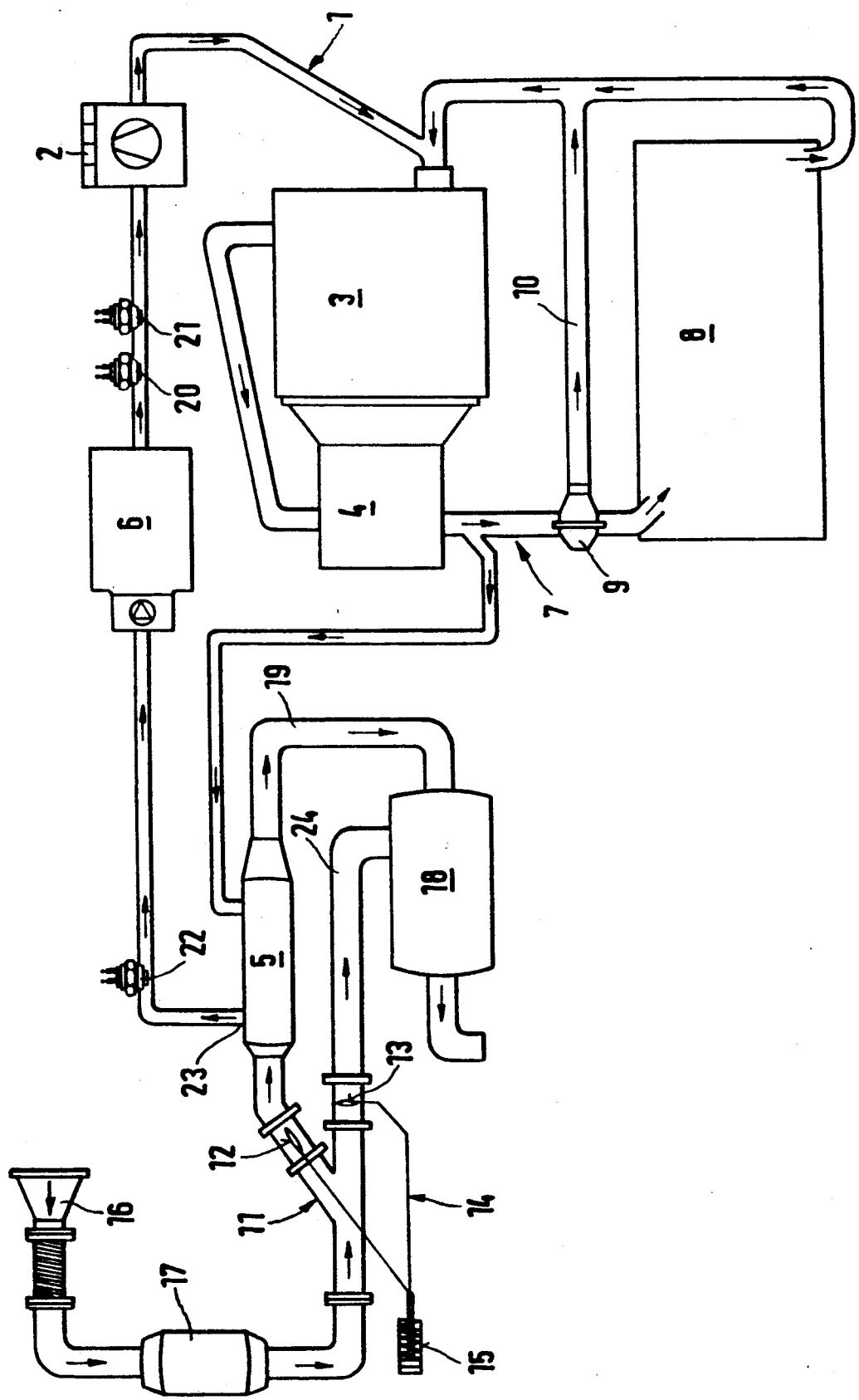

ARRANGEMENT FOR HEATING PASSENGER AREAS OF VEHICLES

BACKGROUND OF THE INVENTION

The present invention relates to an arrangement for heating the passenger compartment or area of a vehicle, and includes a warm water circuit means which serves for the transfer of heat and in which are connected, in series, an internal combustion engine, a torque converter transmission, an exhaust gas heat exchanger, and heating units for the passenger area.

DE-OS 35 09 016 discloses an arrangement for heating passenger areas of vehicles where not only the heat of a cooling water circuit means but also the heat of the exhaust gas is used for the heating arrangement. In order to be able to use the exhaust gasses in the heating arrangement or divert them therefrom, provided between an exhaust manifold of an internal combustion engine and an exhaust gas heat exchanger is an exhaust gas diverter that can be controlled by flaps or valves. By means of a first valve, the exhaust gases can be conveyed directly through the exhaust gas heat exchanger, where the heat from the exhaust gas is transferred to the warm water circuit means of the heating arrangement. In this phase, a second valve blocks off the path to a muffler. If there is an oversupply of heat from the exhaust gas heat exchanger, the valves of the exhaust gas diverter are switched over in such a way that the path of the exhaust gases through the heat exchanger is blocked off, and the exhaust gases are conveyed directly to the muffler. To synchronize the movements of the valves of the gas diverter, a lever or linkage system is provided that is operated by a compressed air cylinder. Thermostats or thermal-lag switches undertake control of the compressed air cylinder; these switches are disposed at the water discharge of the exhaust gas heat exchanger. The exhaust gas heat exchanger comprises tubes through which the exhaust gas flows and about which water flows. After passing through the heat exchanger, the exhaust gas flows directly into the environment. Such a heating system is not in a position to utilize unburned constituents of the exhaust gas for the heating arrangement and to optimally utilize the energy of the fuel.

It is therefore an object of the present invention to optimally utilize the fuel for heating the passenger area of a vehicle that makes frequent stops.

BRIEF DESCRIPTION OF THE DRAWING

This object, and other objects and advantages of the present invention, will appear more clearly from the following specification in conjunction with the accompanying schematic drawing, which illustrates one exemplary embodiment of the inventive arrangement for heating the passenger area of a vehicle.

SUMMARY OF THE INVENTION

The heating arrangement of the present invention is characterized primarily by: an exhaust gas diverter that is disposed upstream of the exhaust gas heat exchanger and is controllable via valve means for selective conveyance of exhaust gas through the heat exchanger or directly via an exhaust gas pipe to a muffler, with a downstream side of the exhaust gas heat exchanger communicating with the muffler; a linkage system and a compressed air cylinder for operating the valve means of the exhaust gas diverter; thermal-lag switch means disposed in the warm water circuit means for controlling the compressed air cylinder; a catalytic converter disposed upstream of the exhaust gas heat exchanger between an exhaust manifold of the internal combustion engine and the exhaust gas diverter; and a burner heating means disposed in the warm water circuit means downstream of the exhaust gas heat exchanger.

By disposing a catalytic converter upstream of the exhaust gas heat exchanger, the unburned hydrocarbon constituents that are produced in the lower partial load range of the internal combustion engine are subjected to an afterburning, with the heat of combustion thereof being conveyed to the heating circuit or warm water circuit means in the subsequent exhaust gas heat exchanger. Since greater quantities of unburned constituents are produced in the exhaust gas particularly during idling, in the partial load range, and during the warmup phase of internal combustion engines, the fuel is optimally utilized; for vehicles that make frequent stops, the otherwise customary supplemental heating can to a large extent be eliminated.

Pursuant to one advantageous specific embodiment of the aforementioned control means, the thermal-lag switch means for controlling the compressed air cylinder, and hence the exhaust gas diverter, includes a first thermal-lag switch and a third thermal-lag switch that functionally act on the compressed air cylinder, whereby at approximately 78° C., the third thermal-lag switch switches over the exhaust gas diverter such that the exhaust gas heat exchanger is shut down and exhaust gas is conveyed directly to the muffler via the exhaust pipe, whereas when the water temperature drops to 73° C., the third thermal-lag switch again switches over the exhaust gas diverter such that exhaust gas is again conveyed through the exhaust gas heat exchanger; to control the burner heating means, at an outlet thereof a second thermal-lag switch is provided that turns off the burner heating means when a temperature of 70° C. is reached; the first thermal-lag switch is disposed at a water discharge of the exhaust heat exchanger and, to protect against overheating, at 90° C. switches over the exhaust gas diverter such that until the internal combustion engine is shut down, no more exhaust gas can be conveyed through the exhaust gas heat exchanger.

By means of the arrangement of the thermal-lag switches and a thermostat, during stop-and-go operation, a rapid heating-up of the internal combustion engine during acceleration is achieved, together with a reduction of fuel consumption and a reduction of wear of components. Via the secondary combustion of the exhaust gases in the catalytic converter, the resulting energy is optimally utilized for heating purposes.

Further specific features of the present invention will be described in detail subsequently.

DESCRIPTION OF PREFERRED EMBODIMENTS

Referring now to the drawing in detail, the inventive arrangement for heating the passenger compartment or area of a vehicle comprises a warm water circuit means 1 in which are disposed the heating units 2. In order to heat the water in the warm water circuit means 1, arranged in series are an internal combustion engine 3, a torque converter transmission 4, an exhaust gas heat exchanger 5, and a burner heating means 6. Connected in parallel with the warm water circuit means 1 is a cooling water circuit means in which is incorporated a water cooler or radiator 8. The cooling water circuit means 7 can be controlled by a thermostat 9 in such a way that the cooling water is either guided through the water cooler 8, or flows via a line 10, so that the cooling water circuit means 7 is quasi short-circuited.

The exhaust gas heat exchanger 5, which is disposed in the warm water circuit means 1, can selectively have exhaust gas flow therethrough or can be taken out of the flow of the exhaust gas. For this purpose, an exhaust gas diverter 11 is provided that is controlled by first and second flaps or valves 12 and 13 respectively. The valves 12 and 13 are controlled via a linkage means 14, which cooperates with a compressed air cylinder 15. The exhaust gas diverter 11 is disposed downstream of an exhaust manifold 16 and a catalytic converter 17. By means of the exhaust gas diverter 11, the exhaust gas can either be guided through the exhaust gas heat exchanger 5, or directly to a muffler 18.

In the position illustrated in the drawing, the exhaust gas is conveyed to the exhaust gas heat exchanger 5 via the opened first valve 12. After leaving the exhaust gas heat exchanger 5, the cooled-off exhaust gas passes via an exhaust gas line 19 and the muffler 18 into the atmosphere.

If the compressed air cylinder 15 is reversed, the first valve 12 is closed while at the same time the second valve 13 is opened. As a consequence, the exhaust gas passes directly via the muffler 18 into the atmosphere.

When the internal combustion engine 3 is started, the cooling water should initially heat up as rapidly as possible. For this purpose, as previously mentioned, the thermostat 9 is closed thereby bypassing the water cooler 8. Thus, the cooling water initially flows through the internal combustion engine 3 itself, thereupon the torque converter transmission 4, and subsequently the exhaust gas heat exchanger 5, which in the illustrated position of the valves 12 and 13 immediately delivers heat for the warm water circuit means 1 after the internal combustion engine 3 has been started. Disposed downstream of the exhaust gas heat exchanger 5 is the burner heating means 6, which can additionally be turned on to provide for a more rapid heating of the warm water circuit means 1.

When the water has reached a temperature of 70° C., a second thermostat or thermal-lag switch 20 turns the burner heating means 6 off. At a temperature of 78° C., a third thermostat or thermal-lag switch 21 reverses the compressed air cylinder 15, so that the first valve 12 is closed and synchronously therewith the second valve 13 is opened, as a consequence of which the exhaust gas is conveyed directly via an exhaust gas pipe 24 to the muffler 18, thereby taking the exhaust gas heat exchanger 5 out of the circuit. If the water temperature drops to 73° C., the exhaust gas heat exchanger 5 is again activated via the third thermostat 21 and a switching-over of the valves 12 and 13.

To prevent overheating, a first thermostat or thermal-lag switch 22 is provided that when a water temperature of 90° C. is reached at a water discharge 23 of the exhaust gas heat exchanger 5 automatically shifts the exhaust gas diverter 11 in such a way that the exhaust gases are conveyed only to the muffler 18 until the internal combustion engine is turned off.

An essential feature of the present invention is the incorporation of the catalytic converter 17, which is disposed between the exhaust manifold 16 and the exhaust gas diverter 11. By means of the catalytic converter 17, unburned constituents of the exhaust gas, such as CH and CO, are oxidized, as a result of which, from a chemical standpoint, harmless end products of combustion are formed and as a side effect, due to the secondary oxidation, additional energy in the form of heat results that is transferred to the warm water circuit means 1 via the exhaust gas and the exhaust gas heat exchanger 5. This is particularly effective for vehicles that make frequent stops. During these driving or operating cycles, the internal combustion engine 3 carries out phases at partial load or idling in which the cooling water circuit means 7 is not adequate to cover the heat requirements of the heating arrangement. However, especially when idling, in a partial load range, and during the warmup phase, the exhaust gases of internal combustion engines have increased constituents of unburned hydrocarbons that are oxidized in the catalytic converter 17 to end products of combustion such as $CO_2$ and $H_2O$ and enrich the exhaust gas with additional heat. The catalytic converter 17, which is inventively disposed upstream of the exhaust gas diverter 11, on the one hand improves the exhaust emission level, and on the other hand saves fuel for the heating process. The burner heating means 6 are now required only during extreme weather conditions.

The present invention is, of course, in no way restricted to the specific disclosure of the specification and drawing, but also encompasses any modifications within the scope of the appended claims.

What we claim is:

1. An arrangement for heating the passenger area of a vehicle, including a warm water circuit means which serves for the transfer of heat and in which are connected, in series, an internal combustion engine, a torque converter transmission, an exhaust gas heat exchanger, and heating units for said passenger area, said arrangement further comprising:

an exhaust gas diverter that is disposed upstream of said exhaust gas heat exchanger and is controllable via valve means for selective conveyance of exhaust gas through said exhaust gas heat exchanger or directly via an exhaust gas pipe to a muffler, with a downstream side of said exhaust gas heat exchanger communicating with said muffler;

a linkage system and a compressed air cylinder for operating said valve means of said exhaust gas diverter;

thermal-lag switch means disposed in said warm water circuit means for controlling said compressed air cylinder;

a catalytic converter disposed upstream of said exhaust gas heat exchanger between an exhaust manifold of said internal combustion engine and said exhaust gas diverter; and a burner heating means disposed in said warm water circuit means downstream of said exhaust gas heat exchanger.

2. A heating arrangement according to claim 1, wherein said thermal-lag switch means for controlling said compressed air cylinder, and hence said exhaust gas diverter, includes a first thermal-lag switch and a third thermal-lag switch that functionally act on said compressed air cylinder, whereby at approximately 78° C., said third thermal-lag switch switches over said exhaust gas diverter such that said exhaust gas heat exchanger is shut down and exhaust gas is conveyed directly to said muffler via said exhaust gas pipe, whereas when the water temperature drops to 73° C., said third thermal-lag switch again switches over said exhaust gas diverter such that exhaust gas is again conveyed through said exhaust gas heat exchanger; to control said burner heating means, at an outlet thereof a second thermal-lag switch is provided that turns off said burner heating means when a temperature of 70° C. is reached; said first thermal-lag switch is disposed at a water discharge of said exhaust gas heat exchanger and, to protect against overheating, at 90° C. switches over said exhaust gas diverter such that until said internal combustion engine is shut down, no more exhaust gas can be conveyed through said exhaust gas heat exchanger.

* * * * *